United States Patent
Hansen et al.

(10) Patent No.: US 11,544,713 B1
(45) Date of Patent: Jan. 3, 2023

(54) FRAUD DETECTION USING AUGMENTED ANALYTICS

(71) Applicant: United Services Automobile Association (USAA), San Antonio, TX (US)

(72) Inventors: Gregory D. Hansen, San Antonio, TX (US); Andre R. Buentello, San Antonio, TX (US); Ashley R. Philbrick, San Antonio, TX (US); Jose L. Romero, Jr., San Antonio, TX (US); Reynaldo Medina, III, San Antonio, TX (US); Curtis M. Bell, San Antonio, TX (US); Yevgeniy Khmelev, San Antonio, TX (US); Stacy C. Huggar, San Antonio, TX (US); Ruthie Lyle, Durham, NC (US); Victor Kwak, Frisco, TX (US); Jon D. McEachron, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 152 days.

(21) Appl. No.: 17/039,432

(22) Filed: Sep. 30, 2020

Related U.S. Application Data

(60) Provisional application No. 62/908,191, filed on Sep. 30, 2019.

(51) Int. Cl.
*G06Q 20/40* (2012.01)
*G06N 20/00* (2019.01)

(52) U.S. Cl.
CPC ......... *G06Q 20/4016* (2013.01); *G06N 20/00* (2019.01); *G06Q 20/405* (2013.01)

(58) Field of Classification Search
None
See application file for complete search history.

(56) References Cited

U.S. PATENT DOCUMENTS

| | | | |
|---|---|---|---|
| 2015/0170147 A1* | 6/2015 | Geckle | G06Q 40/02 705/44 |
| 2016/0071017 A1* | 3/2016 | Adjaoute | G06Q 20/4016 706/52 |
| 2016/0117778 A1* | 4/2016 | Costello | G06N 20/00 705/4 |
| 2018/0350006 A1* | 12/2018 | Agrawal | G06F 7/026 |
| 2019/0005502 A1* | 1/2019 | Kumar | G06Q 30/0205 |
| 2019/0073885 A1* | 3/2019 | Bess | G08B 21/182 |

OTHER PUBLICATIONS

T. Allan and J. Zhan, "Towards Fraud Detection Methodologies," 2010 5th International Conference on Future Information Technology, 2010, pp. 1-6, doi: 10.1109/FUTURETECH.2010.5482631. (Year: 2010).*

* cited by examiner

*Primary Examiner* — Gregory S Cunningham, II
(74) *Attorney, Agent, or Firm* — BakerHostetler

(57) ABSTRACT

Systems and methods ingest extensive data regarding real-time transactions to determine correlation between a variety of parameters and possible fraud events. Possible fraud can be predicted, and notifications delivered to a fraud team. Correlations can be discovered using unsupervised machine learning, and particular systems and methods can utilize natural language processing to both receive and provide information concerning fraud risk and countermeasures.

20 Claims, 6 Drawing Sheets

FRAUD DETECTION USING AUGMENTED ANALYTICS

TECHNICAL FIELD

This patent application claims priority to and the benefit of provisional patent application 62/908,191 filed Sep. 30, 2019, which is incorporated herein by reference in its entirety.

TECHNICAL FIELD

The field of invention relates to augmented analytics, and more particularly to predicting and reducing fraud, and modifying policies or management for risk of fraud, using augmented analytics.

BACKGROUND

Ever larger amounts of data are available to businesses and their customers. Some may come through deliberate entry or submission and retention. Other can be collected passively through the vast array of networked devices and communication channels available today. Users' locations, activities, purchasing habits, communication, et cetera, can all be aggregated when permissions are granted to access and share data. This information is dramatically more complex and fulsome than information routinely utilized in, e.g., actuarial data sets.

While a great deal of resources are committed to collecting, communicating, and aggregating this data, it is not always useful. It is overwhelming to any human observer. To begin to grasp information therein, computers have been utilized. However, it is not well understood how to best harness the use of computers in this regard.

Fraud detection remains a challenge and results in dramatic losses for financial service companies. As sensors and network connections proliferate, volumes of data are becoming available that could be used to identify new factors or combinations of factors that are suggestive of fraud. It would be beneficial to develop a system that could identify real-time transactions involving fraud risk, particularly relating to previously undiscovered correlations which may be discoverable through machine learning.

One aspect which could be improved is the prediction and reduction of, or adjustment for, fraud in real-time transactions. There is a need for new techniques to utilize data to improve and increase efficiency in fraud avoidance.

SUMMARY

The needs existing in the field are addressed by the present disclosure, which relates to systems, methods, and computer usable media for predicting and reducing or avoiding fraud.

In an embodiment, a method comprises ingesting fraud data related to a fraud event. The fraud data includes contextual data describing context surrounding the fraud event, and the fraud data is ingested to an individual record associated with an entity involved in the fraud event, and wherein the individual record has a record format. The method also comprises ingesting real-time transaction data, wherein the real-time transaction data includes data describing a requested transaction and transactional contextual data associated with the requested transaction. The method also comprises determining whether a correlation match exists between the fraud data and the real-time transaction data and causing an action to close the real-time transaction associated with the real-time transaction data based on the correlation match. Closing the real-time transaction includes causing completion of the real-time transaction when the correlation match does not exist, and closing the real-time transaction includes freezing the real-time transaction when the correlation match exists.

In another embodiment, a system comprises a non-transitory computer-readable medium storing instructions. The instructions are configured to effectuate a data ingestion component configured to ingest fraud data related to a fraud event and real-time transaction data related to a real-time transaction request, wherein the fraud data includes contextual data describing context surrounding the fraud event, wherein the real-time transaction data includes data describing a requested transaction and transactional contextual data associated with the requested transaction, wherein the fraud data is ingested to an individual record associated with an entity involved in the fraud event, and wherein the individual record has a record format. The instructions are configured to effectuate a correlation component configured determine whether a correlation match exists between the fraud data and the real-time transaction data. The instructions are also configured to effectuate a user interface configured to provide a notification based on the correlation.

This summary is intended to provide a short description of some aspects only. Additional and alternative details will be apparent on review of other portions of this disclosure.

DETAILED DESCRIPTION OF ILLUSTRATIVE EMBODIMENTS

Figure 1:
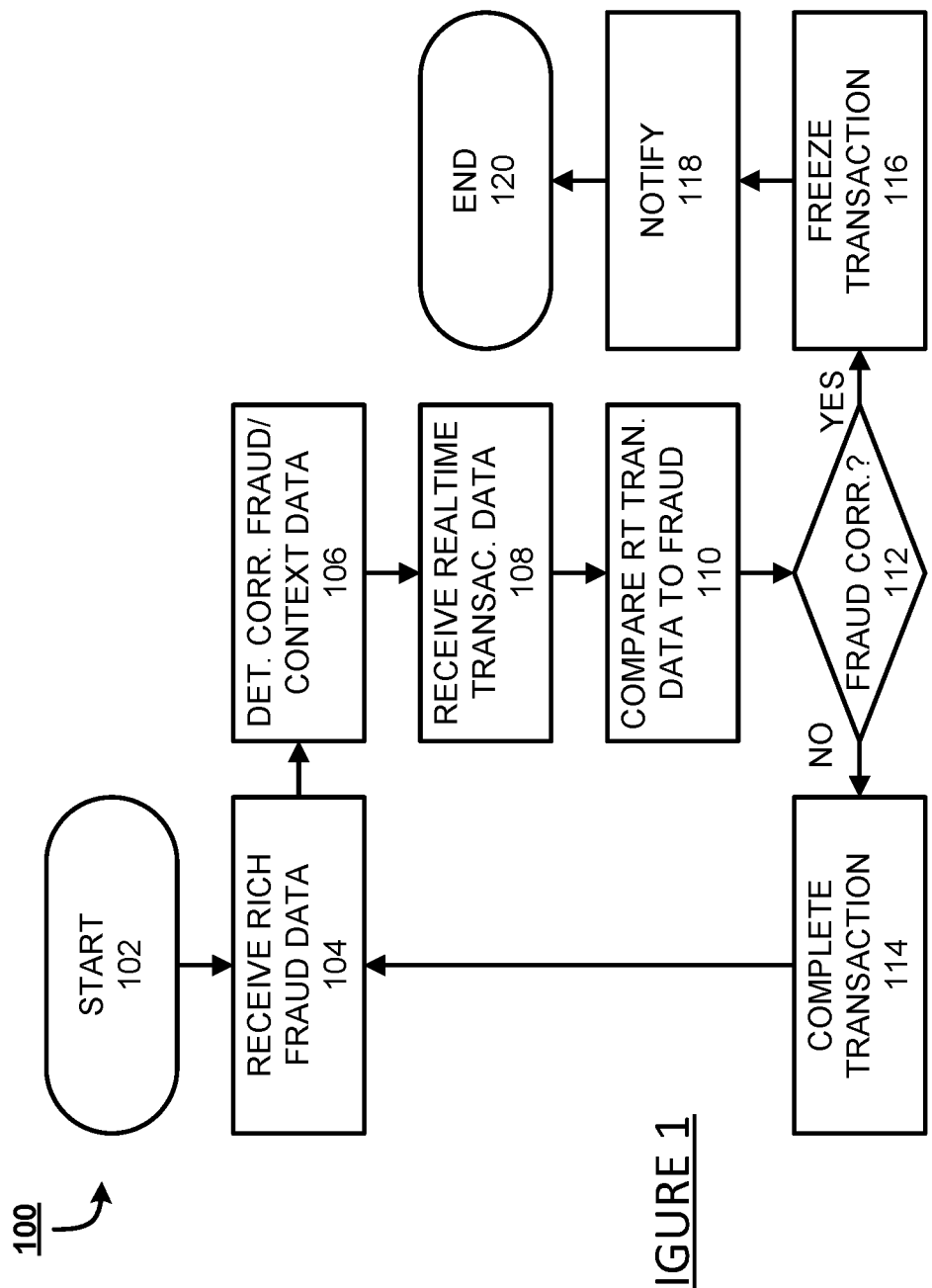
FIG. 1 is a flowchart of an example methodology disclosed herein.

Certain tools for analyzing data in the context of account management and fraud prevention can be improved through the development of augmented analytics technologies which can be used to develop actionable insights. Conventional techniques lack such capability. For example, human programmers or scientists can inject bias into the analysis cycle by creating routines that search for known relationships. Seeking to break these biases dramatically increases the labor required and does not guarantee actionable outcomes. However, without such constraints, the data is not pared down, or coincidental and irrelevant factors associated with a particular event may be distracting or increase labor. One of several problems concerns how to fully explore available data without increasing human labor burdens beyond available levels. Another such problem involves taking the results of such detailed analysis and discerning real-world actions that can be taken in response. Aspects disclosed herein provide a technological improvement and practical application of aspects described to solve these and other problems. In particular, the improvements disclosed herein practically apply such analyses to identify fraud risk or events and countermeasures or corrective actions based thereon. This constitutes a practical application thereof by freezing or completing a transaction based on the result of the analysis.

Embodiments herein concern the use of augmented analytics to provide actionable feedback that detects, reduces, and/or prevents fraud. The events, context, circumstances, statuses, et cetera, around fraud events can be analyzed to determine which aspects thereof correlate with fraud or attempted fraud. Circumstances or combinations of circumstances (at one time or occurring over time) can be correlated with fraud. Thereafter, circumstances surrounding transactions (e.g., ongoing transactions, requested transactions, recent transactions, account access requests, credential requests or requests to reset credentials, account information change, large transactions, frequent transactions, infrequent transactions, account opening or closure, et cetera) can be analyzed in real-time and when circumstances correlating with fraud are detected action can be taken in response, such as blocking or completing the transaction, notifying parties involved, changing security or credentials, requesting further verification, et cetera. Moreover, proactive actions can be taken based on circumstances correlating with fraud in the absence of a transaction, such as taking preemptive action to reduce correlation with fraud, assist at-risk parties before their next transaction is completed, et cetera.

Artificial intelligence (AI) or machine learning (ML) herein can include a variety of techniques for discovering correlations or refining analyses performed while searching for patterns or correlations. Supervised machine learning involves training of an agent using labeled training data as a set of training examples. In this manner, examples which are provided to identify relationships can be mapped to new data where relationships are not identified. Unsupervised learning, in contrast, can analyze data that has not been labeled, classified, categorized, or otherwise prepared with details for how to identify relationships, correlations, patterns, et cetera. Reinforcement machine learning involves the ingestion of additional data to allow the AI/ML agents to self-improve based on the additional feedback or evaluation data and application of their current calculations to data representing actual outcomes based on their previous calculations. Machine learning techniques utilized herein can ingest data and determine values based on ingested data using, e.g., categorization, regression, transcription, translation/machine translation, structure output determination, anomaly detection, synthesis and sampling, imputation of missing values, denoising, density estimation or probability mass function estimation, or other techniques.

FIG. 1 illustrates an example methodology 100 for predicting and recognizing fraud. Methodology 100 begins at 102 and proceeds to 104 where rich fraud data is received. Rich fraud data can include any and all available data relating to a known or suspected fraud event. In embodiments, non-fraud-related data can also be received, e.g., data relating to third parties and/or all entities who could (based on assets, accounts, et cetera), but did not, experience fraud. In this manner, biases present in data that would occur by analyzing only those entities that actually experience fraud or attempted fraud (e.g., survivorship bias, incidence-prevalence bias, exclusion/inclusion biases) can be avoided. Moreover, collecting data continuously and analyzing data before and after losses can avoid length or duration bias. Thus, maximizing available data can allow both positive and negative results (e.g., how to assess the likelihood of an event or the likelihood that the same event will not occur) can be explored in the most rigorous manner. Fraud data and non-fraud-related data, and/or contextual data related with either, and can include (but is not limited to) actions, behaviors, statuses, locations, accounts, assets, liabilities, et cetera. In embodiments, fraud data or contextual can be received that describes more than one entity or individual.

Data may be received in a prepared state, or can be prepared and processed utilizing machine learning or various rule-based approaches. While the term "machine learning" is used here, it is understood that deep learning, neural networks, and other intelligent approaches are embraced by the disclosure herein.

Rich fraud data, non-fraud data, and/or contextual data can be stored in a record associated with each individual or entity to which the analyses described herein are applied. Records can be stored in a database of similar records (e.g., describing an individual or entity). A record can have a plurality of fields. Fields can be identified and populated by machine learning (or other techniques) during ingestion of data for analysis. Machine learning (or other techniques) can performed data preparation to strip out incongruent data, prepare relevant data, and identify patterns in a manner avoiding the biases and inefficiencies of human data scientists. Generation and updating of records can occur during data prep and ingestion. This can include population of metadata associated with identified "payload" data (e.g., the information ingested describing the entity to which the record corresponds) to describe the data itself in terms of, e.g., confidence, source, time or date stamp, original format (to the extent that the payload is reformatted for database uniformity), identification of related fields in the record or other records, et cetera. Records can also have shared fields, or shared records can exist, that either refer to or populate throughout a variety of records to which they apply (e.g., data points describing events or aspects applicable to populations of more than one, such as financial market activity, political events, weather events, other public events, et cetera). Records need not be fixed in size or fields, and in embodiments, fields can be dynamically added to one or more records as identified by machine learning (or other techniques). In this regard, payload data and metadata can be organized to allow for detailed analysis of records to discover patterns or trends relating to the entity or entities at large in a consistent manner across ingested data.

It is to be understood that, with respect to one individual, their individual activity data may be contextual data for a third party, and vice versa. Thus, when looking at groups of members, each can be individually analyzed (e.g., their individual activity data can be correlated) with respect to one another, as can parties that do or do not experience fraud and/or third parties. Further, contextual data need not apply specifically to any one entity, but may apply to two or more generally as discussed herein. Still further, an individual's earlier individual activity data may be contextual data for that individual at a later time (e.g., context pertaining to that individual relating to when they experienced or avoided a fraud event can be correlated to future context to discover opportunities that may repeat previous success or avoid previous problems).

Data or data points can be analyzed to correlate an event to some other data point(s). The other data points can include contextual data. Contextual data can include a variety of data or data sources which can be analyzed for correlation with the event. Contextual data can be other events (e.g., eating breakfast at 6:30 AM EDT, a particular date of a failed and unauthorized attempt to access an account, days until or since a recent federal holiday), states or conditions (e.g., the presence of particular software on a device, an account balance), other information which can be quantified or qualified, or changes and differentials thereto (e.g., driving 15 mph faster than previous day, spending more at an establishment for two successive months). The particular values, ranges, or incidences (e.g., whether or not something occurs, how many times it has occurred, a measurement quantifying one or more occurrences), et cetera, are parameters of the contextual data. Contextual data can be grouped in types. These can include, in non-limiting examples intended not to constrain but to suggest the spirit of possible types, such as an "app" type that would identify and characterize a mobile application as well as its usage, et cetera; a "food" type that would identify and characterize food purchased or consumed in terms of, e.g., costs, time of purchase or consumption, amounts, nutrition et cetera; a "movement" type that counts steps walked, miles driven, speed, orientation, acceleration, et cetera; and so forth. Where contextual data becomes richer, a new field can be added for new parameters (e.g., if a mobile device's health sensor is enabled and heartrate becomes available when it previously was not, a new field can be added to one or more "health" types).

Fraud events herein can be, for example, one or more actual or suspected fraud events (e.g., real-time financial transactions), such as online purchases or other electronic or in-person financial transactions, access or access attempts to accounts, improper or false identification (as a document or an attempt by a person to pass themselves off as another), attempts to change passwords, attempts or inquiries to access information, spear phishing or other targeted attempts to steal or breach access or information, et cetera. Types of fraud can relate to any financial instruments including one or more of checks, debit cards, credit cards, electronic transactions, and opening or closing of accounts, et cetera. Other events of interest to service providers, such as suspected fraud, or events separate from fraud that nonetheless comprise the security or perception of security for account holders (e.g., attempted fraud) can also be determined. Events and context data can include fields or parameters identifying the particular source of the data as an individual or entity as well as include fields or parameters linking the sources/entities to demographic and other details allowing for aggregation and grouping. More generally, events can be any event, and can be used (with other information such as statuses) to correlate to fraud events.

In a more specific example, "public" events that apply to more than one person are also included in those events analyzed: financial market activity, political or social activity, disruptions to travel or business, disasters, weather, and so forth. Events can include entity action data, which includes data describing something a member does or does not do. In comparison, events that would not be characterized as "entity action data" would be events that occur in the same manner independent of entity behavior. Events that do not comprise entity action data may still influence events included in entity action data, but entity action data will rarely, if ever, influence events that are not entity action data. For example, an entity's behavior would not influence the occurrence of an earthquake, and an average individual entity's retirement account allocations are unlikely to move a major stock index in any observable manner; but an earthquake or stock index change may influence an entity's action and entity action data reflective thereof.

Rich fraud data, and/or non-fraud data, can include (but is not limited to) information provided through application or periodic update questionnaires, and, where authorization is given to access one or more other sources, cellular or mobile device data (including location, owner activity, social media activity and interactions, communications with others, applications installed and application usage, web history and usage, et cetera), purchasing or spending data (including types of purchases, time of purchases, frequency of purchases, subscriptions, et cetera), vehicle data (including gas consumption, performance, driver behavior, et cetera), Internet of Things device data (e.g., data received from smart vehicles or appliances including usage, activity detected thereabout), health data (e.g., from device sensors that measure physical activity, sleep, diet, heart rate, blood pressure, et cetera; from healthcare providers; et cetera), financial data (e.g., from financial institutions, employers, et cetera), employment data, relationship data (and data from known relations such as spouses, parents, children, siblings, friends, coworkers, et cetera), educational data, marketing data, location data (for locations where a party spends time, such as economic data, crime data, health data, environmental data, income data, et cetera, or information about services available and other similar in an area), hobbies, habits, entertainment, demographic data, et cetera. Such data can relate to individuals, legal entities, groups thereof, and various other accounts, assets, identities, or things that can be stolen or defrauded. Each of these can be classified or characterized as a particular parameter or data type. Rich fraud data can also include a confidence level associated with each data point, which can rank or weight particular types of data based on their source (e.g., directly from entity to which data relates, from a source or post associated with the entity to which the data relates, from a third party), the absence or presence of corroborating data (e.g., second data point indicating a similar or related conclusion to a first data point), or other means.

The rich fraud data (or other data) can include both current/real-time/rolling data about entities possessing accounts, assets, or identities posing fraud risk. Data received or available from databases can also include past data of the same type or class as the current/real-time/rolling data to allow for comparison and analysis of similar parameters or types as well as cross-analysis of disparate parameters or types. While "rich fraud data" or "fraud data" may be used to describe individual instances of fraud, it is understood that data can be aggregated and analyzed with relation to more than one instance or related party. Thus, where in this disclosure a reference is made to "fraud" or an entity in the singular, it is understood that the plural may be aggregated and analyzed without departing from the scope or spirit of the innovation.

At 106, correlations between events (e.g., financial fraud or absence thereof) can be analyzed. Correlations can be found between parameters and a single event or multiple events. This involves analyzing current data, or a particular entity's data, in view of the larger data sets for all entities or relevant subsets of entities for the available history as to a given parameter or data type. Such correlations can be determined through multiple iterations of machine learning analysis. In an embodiment, unsupervised machine learning can analyze recent or current contextual data for one or more parties at risk of fraud to determine a set of strongest correlations. For example, several hundred correlations may be identified and ranked according to the strength of correlation. Trained analysis or feedback can be provided to select or discard correlations among those identified based on whether the correlation exceeds a threshold, the value of the event (e.g., where multiple possible fraud events are correlated, the amount at stake if the correlated fraud occurs in any one instance), and/or the utility of a given correlation. As to utility, for example, coincidental or uncontrollable correlations—such as cloudless, sunny days occurring in Jacksonville 52 and 37 days before fraud occurred in San Diego—can be discarded. However, the presence and frequent use of a particular app on mobile phones correlating to identity theft attempted against those users can be retained. In embodiments, the correlations presented can be filtered according to a threshold of likelihood that an event occurs at a given time or at any point in the future. This can be implemented through supervised machine learning, or involve presentation to trained personnel through a user interface and allow for human input used to determine actionable correlations. In embodiments, an actionable correlation is one in which the correlation informs at least one aspect within the control of an involved entity, to change the probability of an event, and/or reduce or increase correlation as to that event. In embodiments, the value of the event can be used as a weight in association with one or both of a correlation threshold or utility indication to assist with ranking, rather than a separate basis for selecting or discarding a given correlation.

As discussed above, the data received can include real-time transaction data (and other data), which may be received at 108. The real-time transaction data can include any data associated with or related to the real-time transaction. Examples of such real-time transaction data can include data required to complete the transaction (or a sanitized version thereof to prevent spillage of sensitive data), as well as contextual data around the transaction and parties involved in the transaction. Data related to the transaction (which may be contextual data or transaction data) can include, e.g., time, voice tone, transaction history, biomarkers, location, and transaction type, et cetera.

At 110 a comparison is made between the real-time transaction data and the rich fraud data. This comparison can, in embodiments, operate substantially similarly to the correlation determination made at 106 as discussed above. This may, in embodiments, invoke supervised machine learning, or an iteration of unsupervised followed by supervised machine learning, to determine if an event of fraud has likely occurred. This comparison at 110 can include (but is not limited to) identifying a correlation match between the real-time transaction data and one or more known or unknown fraud suspects. This can be achieved, for example, by identifying one or more markers for the fraud suspects and then flagging a present marker existent in the real-time transaction data. Examples of such markers can include but are not limited to, e.g., origin, voice print, behavior pattern, et cetera.

In an alternative embodiment, methodology 100 can omit aspects at 106, and proceed to determine correlations only after real-time transaction data is received. In such embodiments, at 110, correlations are determined between previous fraud/fraud attempt events and the details of the real-time transaction to which the data relates, including analysis of all of the contexts surrounding both the rich fraud data and the real-time transaction data.

At 112 a determination is made as to whether an actionable correlation relating to a possible fraud is found. Actionable, in this regard, can refer to a finding that is timely. "Timely," in this context, means before the occurrence of an event that renders the action moot (e.g., closure of an account at risk of fraud, expiration of an identification that has been compromised, change of vital statistics) with time available to act before such inevitability; and in embodiments may also refer to being within a chronological proximity of such predicted event so that it is relevant to the member or membership target being contacted (e.g., notify increase fraud protection one month to two weeks before predicted international travel so that the offer is relevant but made with sufficient time to consider).

Actionability, in certain embodiments, can be based on a particular type of action (e.g., change in behavior or use, security measure, contacting third party, et cetera) is likely to result in the desired outcome (fraud avoidance). "Likely" here can be relative; while it may not be effective for all parties, it may be worth incentivizing in all cases as even a 5% fraud avoidance would be cost-effective for the party performing methodology 100 or a party indemnifying or cost sharing with the entity being analyzed. Moreover, costs may be associated with offering the incentive (e.g., by mail, using human labor to call or visit property or persons, by automated email), and such means of warning of possible loss may also be factored into cost-benefit analyses. Costs can be compared with a projected benefit (e.g., projected savings from avoided losses due to reimbursed fraud, projected income from accounts retained due to avoidance of non-reimbursed fraud losses). Where the likelihood of 1) parties taking the corrective action to avoid the possible fraud and 2) savings by preventing a sufficient amount of fraud loss does not justify the expenditure, the fraud risk may not be actionable.

Actionability, in certain embodiments, can be based on closing or reconciling a "context difference." Where the context data containing loss events is analyzed for correlations with individual activity data for an entity at risk of fraud correlate, but also include differences that independently correlate to the occurrence or non-occurrence of the enrollment or deepening event, a correlation can be found actionable when the entity or another interested party can take an action to close or reconcile that difference. For example, where context data shows net worth above a certain threshold increases the likelihood that fraud avoiding action is taken in a variety of circumstances, the entity may be offered incentives, rebates, rate accommodations, or advice to assist with achieving that net worth. Similar actions could be taken regarding understanding of finances, products, world events; access to certain private or subscription-based information; professional or social contacts; regularity of personal contact with a member services representative ("MSR") or other representative of an organization responsible for detecting or addressing fraud; et cetera. These foregoing details are provided only for purposes of example, and other options will be appreciated on review of the disclosure herein.

In embodiments, techniques herein need not be stand-alone machine techniques, but may be used to augment one or more human MSRs who are actively working to prevent, detect, and/or mitigate fraud. For example, a trigger to cause updated analysis can be scheduled or actual contact between an MSR and a member/account. Before or during the contact, the MSR can be provided actionable insights intended to improve the likelihood of preventing or mitigating fraud. Moreover, while "MSR" is generally used in the context of one membership organization's representatives, in embodiments data sharing may occur between multiple organizations and techniques herein can be leveraged to provide third parties or complementary representatives capabilities to better service individuals. In this manner, systems, methods, products, services, et cetera described herein can be "organization agnostic."

Actionability may additionally be based on whether any action is available. For example, if the user has disabled messaging from the insurer/indemnifier, or if the phone number available is disconnected, the location of an asset that could be subject to fraud attempts is unknown, or if no action can be completed to close a context difference (either because it is impossible or because the cost of performing such action exceeds a threshold), the determination at 112 may return negative.

If the determination at 112 returns negative, methodology 100 can proceed to 114 where the real-time transaction can be closed, completed, or handled by permitting the real-time transaction to proceed (e.g., to complete the transaction). Thereafter, methodology 100 can recycle to 104 and continue monitoring.

If the determination at 112 returns positive, methodology 100 can proceed to 116 where the real-time transaction can be closed, completed, or handled by prohibiting the real-time transaction from proceeding (e.g., to freeze the transaction). Other actions can also be taken automatically or based on responses provided from notified MSRs or administrators (e.g., trace the phone number or IP address, notify the holder, contact law enforcement).

Upon freezing the real-time transaction at 114, methodology 100 can proceed to 118 where an alert or notification can be issued to one or both of the user and issuer (e.g., insurer, bank, card issuer, loan servicer, et cetera) using an interface. In various embodiments, aspects at 118 (or elsewhere) can determine a trigger for initiating an action described herein. In various embodiments, triggers can be set for immediate or "when able," on-demand at a time to be determined, scheduled for a specific time, or based on the occurrence or non-occurrence of an event. Examples can include, but are not limited to, immediate email or phone call (automated or by MSR) to discuss a predicted future fraud risk; phone call when an abnormality is detected in one or more accounts or access attempts; a trigger with respect to a specific issue to be raised on the next contact received from the customer regardless of when that occurs or what issues such contact pertains to; or a social media communication sent after 5:00 PM (member's local time) on a specific date and time that will be timely at that time. As will be understood, these brief examples (like all herein) are provided for purposes of example only, and the issues, events, times, communication channels, triggers, et cetera, can vary without departing from the scope or spirit of the innovation.

Thereafter, at 120, methodology 100 can end, or may recycle to 104 or any other aspect.

Aspects at, e.g., 110, 112, or 118, or in alternative or complementary embodiments elsewhere in methodology 100, natural language processing can be utilized to more clearly communicate inputs and outputs related to the analyses. For example, effectuation of an action at 118 can be processed through natural language processing to automatically effectuate personalized communication with the user to report fraud or suspected fraud, or provide instructions to an MSR or third party to guide personalized communication related thereto. In alternative or complementary embodiments, a query can be posed by an MSR, or by an existing or prospective member, to a system operating methodology 100 or aspects thereof, and natural language processing can be used to initiate analyses using techniques described herein to provide a response to the query, which can be converted back to natural language to respond. For example, an MSR may ask for the events or statuses that correlate to a particular user's highest risk of fraud, or a user may ask how to avoid fraud while stationed abroad. In these and other instances, available contextual data can be analyzed to provide feedback likely to answer these example (or other) queries. Finally, natural language processing can be utilized, in alternative or complementary embodiments, at 104 or other instances where data is ingested, allowing non-technical users to describe the data or a data point value such that it can be ingested and utilized to populate fields in user records.

Figure 2:
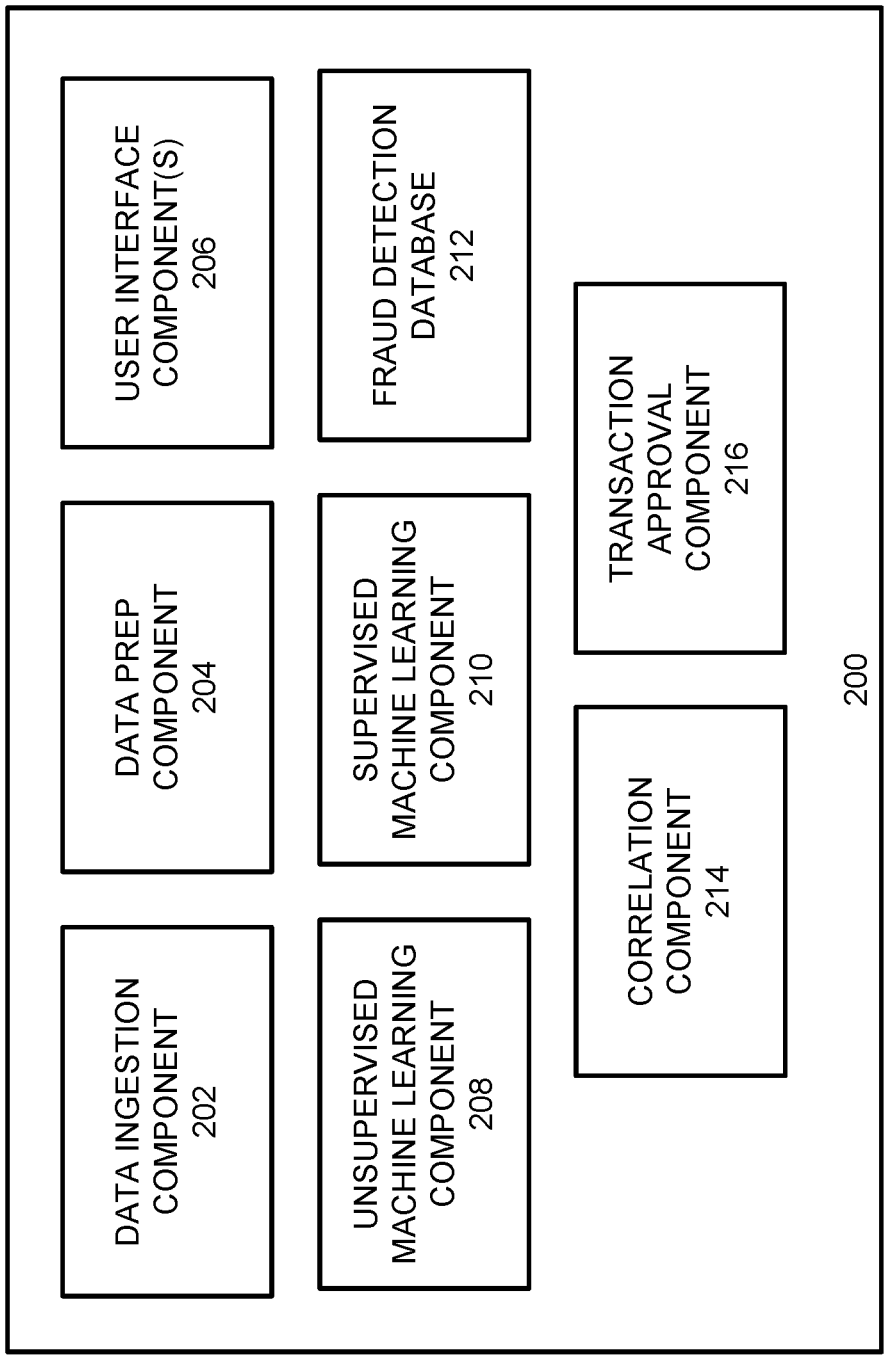
FIG. 2 is a block diagram of an example system disclosed herein.

FIG. 2 illustrates an example system 200 for predicting and reducing financial fraud events. System 200 includes data ingestion component 202, data preparation component 204, user interface component(s) 206, unsupervised machine learning component 208, supervised machine learning component 210, fraud detection database 212, correlation component 214, and transaction approval component 216.

Data ingestion component 202 can be one or more communicative connections to various data sources to populate records (e.g., individual records with histories of fraud, individual records with no history of fraud, social media, news reporting, partner entity databases, et cetera), and can serve as an intermediary between one or more databases (including but not limited to fraud detection database 212) and other components herein. In embodiments, data ingestion component can include various interfaces to devices or network locations to receive current/real-time/continuous context data regarding entities at risk of fraud, both for analysis and to build fraud detection database 212.

Data preparation component 204 can prepare data according to its class or type to complete ingestion and allow for its systematic storage in, e.g., fraud detection database 212. Preparation can occur using supervised machine learning, and may utilized unsupervised machine learning or reinforcement machine learning based on results from supervised machine learning over time. Data preparation component 204 can reduce the labor component of analysis for large sets of data from known data streams, and may correlate new data streams to known data types to establish a new data structure or type for its consistent storage and ease of analysis thereafter. Data preparation can include arranging the data according to records, which can have predetermined or unconstrained field options (and, in the latter case, machine learning or other techniques may define new fields on-the-fly), and can include metadata associated with payload data to reflect the age, associated confidence level, source, et cetera, of said respective payload data or other record information. Records as described herein, or "raw" or otherwise-arranged individual activity data and contextual data, can be stored in fraud detection database 212 and/or other databases.

Interface(s) 206 can be one or more components or subcomponents that communicate with one or more of data sources, a party at risk of fraud (e.g., to provide an alert, recommendation, notification of credit or penalty, et cetera), a service provider, an insuring/indemnifying party or its agents (e.g., to provide alerts, notification of credit or penalty, correlations for review, et cetera), fraud suspects, or others. Interface(s) 206 can be graphical user interfaces on applications (desktop or mobile) or websites, application programming interfaces (APIs), or other means for providing and/or receiving data.

Unsupervised machine learning component 208 provides unsupervised machine learning capability and can analyze one or more events (e.g., fraud, attempted fraud) and parameters or historical data to determine whether any correlations exist between that event and various ingested data points defining context around the event or similar events/event types. Supervised machine learning component 210 provides supervised machine learning capabilities and can analyze one or more events and parameters or historical data to determine whether correlations exist with that event based on its training, which can change over time.

Correlations can be saved to a correlation data type with attributes quantifying the strength of particular correlations (based on, e.g., the confidence in underlying data and/or the quantitative amount of correlation). Correlations can involve interactions of two, three, or more parameters (e.g., individual data points in context data), as absolutes or over periods of time, and such periods of time can be the same or differ for one or more of the parameters (e.g., daily minutes of use of application on mobile phone, weekly level of physical exercise, and two highest dollar amounts spent at coffee shops in single transactions in reference to a particular type of loss). In embodiments, separate data types or data structures can be provided for correlations based on whether they are analyzed by unsupervised machine learning or supervised machine learning. In such implementations, duplicate or highly similar correlations can be found, but confidence or data resolution can be increased through subsequent analyses performed with different types of machine learning. In embodiments, a common data type can be used, but a field or parameter can indicate the type(s) of machine learning applied to the correlation discovered.

In embodiments, correlations of correlations can be found by analyzing different entries or sets of correlation type data in reference to one another. In this regard, the presence of one correlation may not provide significant predictive effect, but the presence of multiple correlations, or correlated correlations, could provide insight as to the likelihood of a particular event or the absence thereof. Thus, one or both of unsupervised machine learning component 208 and supervised machine learning component 210 can analyze stored correlations in reference to events as the amount of correlation data grows. In embodiments, conducting this type of analysis in real-time or over historical data can be used by reinforcement machine learning to improve the predictive capability of the system based on context correlated with particular outcomes or events.

In embodiment, a reinforcement machine learning component can also be provided, but may be a subcomponent (or multiple subcomponents) of unsupervised machine learning component 208, supervised machine learning component 210, and/or correlation component 214. Moreover, one or both of unsupervised machine learning component 208 and/or supervised machine learning component 210 can be subcomponents of correlation component 214, vice versa, depending on the architecture of system 200.

Fraud detection database 212 can be a database for storing event data, fraud data, and other data, as well as correlation data from analysis thereof. Fraud detection database 212 can maintain even initially unhelpful data, such as discarded correlations, for later re-analysis to determine whether apparently inconsequential correlations vanish over time or persist. Where previously discarded correlations persist, if the length of persistence or level of correlation increases above a threshold, the discarded correlation may be flagged, promoted, or reinserted into the active (e.g., not discarded) correlations for consideration.

Correlation component 214 can be provided to manage correlations discovered by unsupervised machine learning component 208 or supervised machine learning component 210, and/or determine correlations by other techniques not involving machine learning. For example, correlation component 214 can utilize probabilistic programming, discrete math, linear programming, expert systems, et cetera. Moreover, correlation component can include a rule-based or machine learning approach to managing data analyzed or correlations discovered by unsupervised machine learning component 208 or supervised machine learning component 210, for example, by determining a data set is too small or short to be statistically relevant and blocking its analysis until more data is received or discarding correlations with which the small data set is involved, or until the confidence level(s) of respective contextual data points involved in the correlation are near certain (e.g., confidence over 90%).

Correlation component 214 can also be used to determine a context difference and determine one or more actions to reconcile or close the context difference. Actions reconciling or closing context difference can be assessed by correlation component 214 and/or transaction approval component 216 to determine their feasibility.

Supervised or unsupervised machine learning can be invoked (with unsupervised machine learning component 208/supervised machine learning component 210 or independently by correlation component 214) to determine correlation with or probability of an outcome involving or avoiding fraud given the available data points relating to a possible fraud target (e.g., member or customer) and associated record(s). In embodiments, supervised machine learning component 210 (or other supervised machine learning) can be used to determine realistic fraud-preventing actions, such as those that can reasonably be effectuated by an interested entity, to counteract the correlation of fraud with an entity's context or current events. Supervised machine learning component 210 (or other supervised machine learning) could likewise be used to determine unrealistic actions for discarding that might be correlated with an outcome given particular contextual data points (e.g., because they cannot be accomplished, because other entities decline or fail to maintain the recommendations above a threshold frequency, because a benefit (e.g., annual profit margin of account times the probability it is compromised by fraud) of a certain action falls below a certain threshold given a cost of taking that action, et cetera). User input may be received for the same purposes, and may be ingested (e.g., using one or both of user interface component(s) 206 and data ingestion component 202) for training of supervised machine learning or reinforcement learning. Transaction approval component 216 can leverage and is operatively coupled with other components of system 200, including, e.g., user interface component(s) 206, unsupervised machine learning component 208, supervised machine learning component 210, correlation component 214, transaction approval component 218, et cetera, to determine timely-actionable actions and act on them at appropriate times. Timely-actionable actions (e.g., fraud reduction actions) identified can define a data type or class, and can be stored in fraud detection database 212.

Transaction approval component 216 can determine and implement how a real-time transaction should be closed or handled (e.g., whether the transaction should be permitted to complete or be frozen and thereby prohibited from completing). Transaction approval component 218 can also receive additional information from, e.g., user interface component(s) 206 and/or correlation component 214 to determine whether additionally-obtained information (e.g., the completion of additional security measures, the provision of additional information to verify authenticity) is sufficient to change the closing or handling of the transaction.

In alternative or complementary embodiments, system 200 can include a natural language processing component, or one or more of data ingestion component 202, data prep component 204, transaction approval component 216, and/or other components can include a natural language processing subcomponent. In system 200 (or other systems and methods disclosed herein) natural language processing can be utilized to more clearly communicate inputs and outputs related to the analyses. For example, effectuation of an action by transaction approval component 218 can be processed through natural language processing to automatically effectuate personalized communication with the fraud risk party regarding the risk and countermeasure, or provide instructions to an MSR or third party to guide personalized communication related thereto. In alternative or complementary embodiments, a query can be posed by an MSR, or by an existing or prospective member, to system 200 or components thereof, and natural language processing can be used to initiate analyses using techniques described herein to provide a response to the query, which can be converted back to natural language to respond. For example, an MSR may ask for the events or statuses that correlate to a particular user's highest risk of fraud, or a user may ask how to avoid fraud while stationed abroad. In these and other instances, available contextual data can be analyzed to provide feedback likely to answer these example (or other) queries. Finally, natural language processing can be utilized, in alternative or complementary embodiments, with data ingestion component 202 or data prep component 204, allowing non-technical users to describe the data or a data point value such that it can be ingested and utilized to populate fields in user records.

Figure 3:
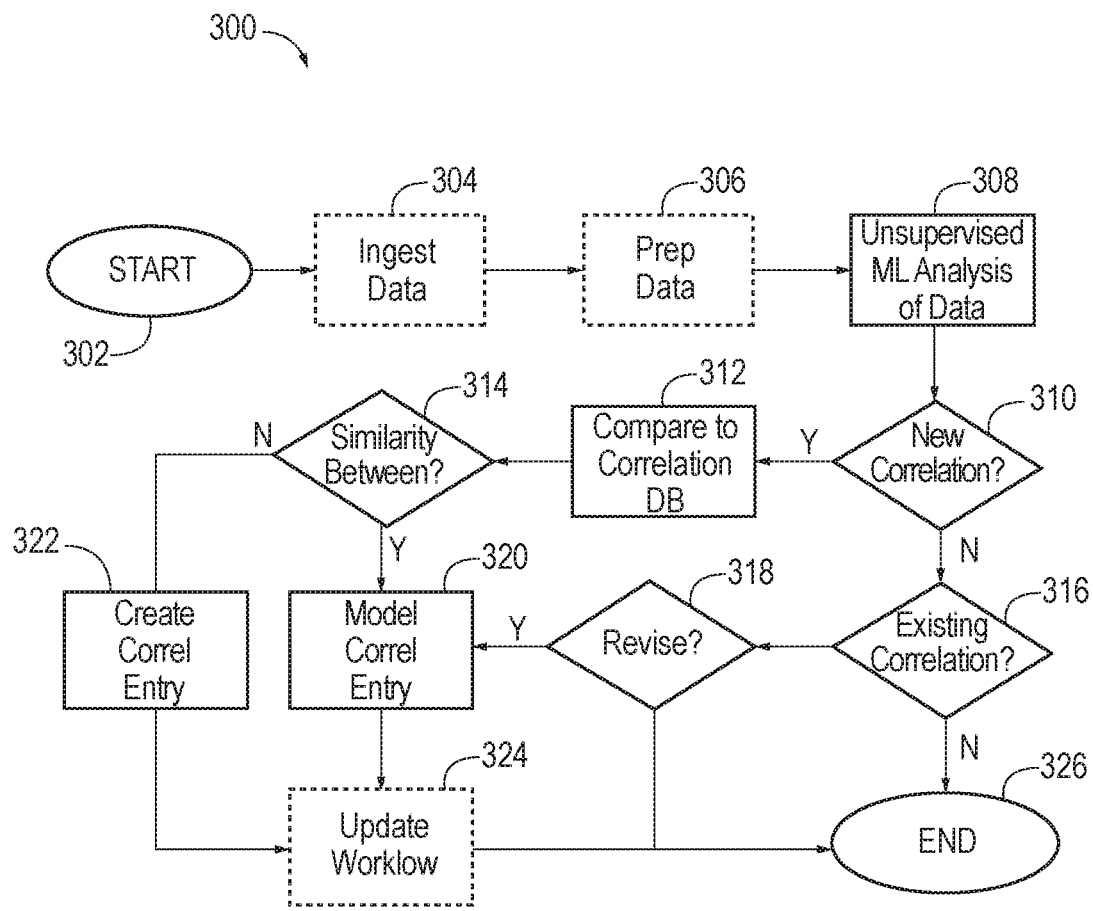
FIG. 3 is a flowchart of an example methodology disclosed herein.

FIG. 3 illustrates an example another example methodology 300 for leveraging augmented analytics. Methodology 300 begins at 302 and proceeds to 304 where, in embodiments, data can be ingested. Data ingested can include (but is not limited to) data types or data from sources described herein. Data can relate to one or more individual members associated with statuses, assets, accounts, events, et cetera, presenting a fraud risk. Data can include individual data about the individual stored in records, data on events (related or unrelated to the individual), and any other available data.

At 306, data can be prepared in embodiments. Preparation of data can involve conversion or reformatting, normalization, or other processes to make all ingested data common and usable. In embodiments, ingested data can be statistically analyzed and outliers can be subjected to further analysis to determine whether they should be weighted or discarded if erroneous or result in skewing of a corresponding data set. Preparation can be concurrent with or part of ingestion such that both are completed after the data is appropriately formatted for storage according to a data structure for the particular type or source. Metadata can be appended to payload data, or records in general, to assist with identifying source, confidence, age, et cetera.

In embodiments where data is already available, methodology 300 can optionally start at 308. Regardless of when initiated, at 308, data can be analyzed for correlation of different datapoints. In embodiments, one or more events can be identified in the data, and context and other events (concurrent, past, or, in embodiments, following the event) can be correlated, whether causative or coincidental. Examples of events can include but are not limited to, e.g., an identity theft, an occurrence of fraud, a response time outside a required level of service, a change to membership or accounts, et cetera.

After determining one or more correlations, a determination is made as to whether a new correlation (e.g., finding correlation between data types, certain ranges of data types, or combinations of data types not previously associated with the event) is found at 310. If the determination returns negative, methodology 300 proceeds to 316 where a determination is made as to whether an existing correlation is found. If the determination at 316 returns negative, no correlations were found and methodology 300 can end at 324.

If the determination at 310 returns positive, and a new correlation between events or events and surrounding context has been discovered, the correlation can be compared to others in a database storing previously correlated events and context at 312. As suggested, groups of events, or sets comprising a series of similar-typed events, can be used to discover a correlation as opposed to viewing each event in isolation and as an independent driver of correlation. A determination is made at 314, based on the comparison as to the similarity. If the comparison determines that the correlation is dissimilar to others, a new correlation entry can be made in the database at 322, unrelated and unlinked to others.

A correlation data structure, by which correlations can be stored, can include the data type or source correlated, parameters related thereto (values, ranges, times, incidences, recurrence, et cetera), the strength of the correlation, confidence in the underlying information, and other information. A correlation data structure can then be used as a basis for comparison. For example, an entity can provide data including some or all of the data types and sources analyzed to discover correlations. Where data matches some or all of the kinds and corresponding parameters in a correlation entry, actions to avoid or prevent fraud can be taken based on the likelihood (or absence thereof) regarding the events correlated with those other events or context. Such actions can include but are not limited to initiating automated communication over one or more channels, prompting an MSR to initiate communication, prompting another member or mutual contact to initiate communication on behalf of the membership organization, offering an incentive (e.g., payment, credit, coupon, discount, reward, et cetera) to change a security setting or account, sending advice or recommending improvements (e.g., increase security, incentive to change to more secure platform or system), increasing general interaction (e.g., soliciting feedback, soliciting options to increase satisfaction, resolving a past complaint) to increase influence regarding fraud-avoiding activities, et cetera.

Returning to the methodology, if the determination at 314 returns positive, methodology 300 proceeds to 320. This aspect is also reached by way of 316. If the determination at 316 returns positive, methodology 300 proceeds to 318 where a determination is made as to whether the existing correlation entry identified should be revised. This can be determined based on any differences between the existing correlation and the one discovered at 308. Supervised machine learning, statistical analyses, data representing feedback from human review, or other techniques can be utilized to confirm an existing correlation and whether differences in the correlation are such that an existing entry should be revised based on identification of the same correlation with certain differences (e.g., wider or narrower range of parameters for a correlated type of context). If the determination at 318 returns negative, no further changes are required, and methodology 300 proceeds to end at 326, or may recycle to, e.g., 304, 308, or another aspect.

If the determination at 318 returns positive, methodology 300 proceeds to 320. Whether reached by 318 or 314, at 320, a correlation entry is used either to create a new entry (e.g., as a model) or to modify the existing entry. In this manner, an entry is created or updated to reflect the most recent data and/or analyses.

Following 320 or 322, methodology 300 can, in embodiments, proceed to 324 where a workflow can be updated. Updating a workflow can include taking, changing, or stopping from various actions based on identified correlations to increase or decrease correlations or the likelihood of an event's occurrence or absence (e.g., occurrence or avoidance of fraud). Thereafter, at 324, methodology 300 can end at 326, or alternatively recycle to another aspect such as, e.g., 304, 308, et cetera.

Figure 4:
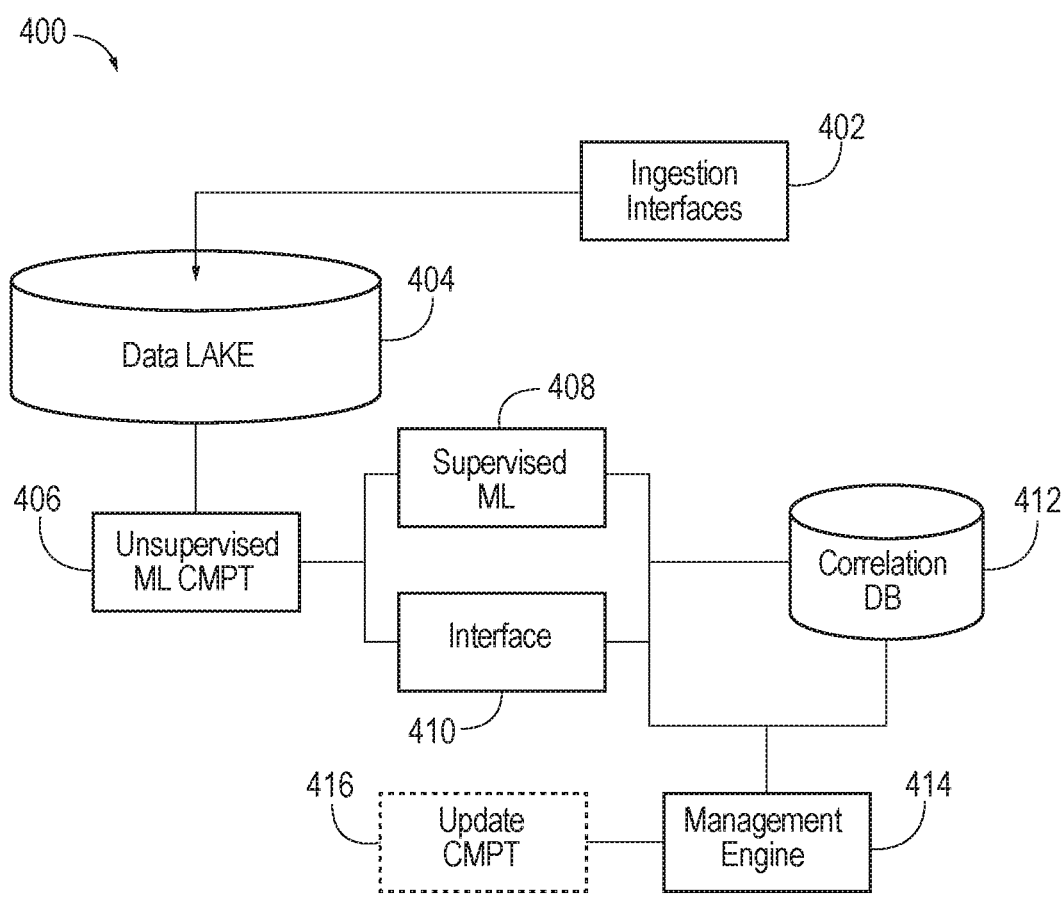
FIG. 4 is a block diagram of an example system disclosed herein.

FIG. 4 illustrates a system 400 for implementing aspects disclosed herein. System 400 includes ingestion interfaces 402 for receiving event data and context data, which can include access to other databases, application programming interfaces, graphical user interfaces, and other means for receiving data. Data lake 404 can receive information from ingestion interfaces 402 and be a comprehensive store of event data and context data.

Unsupervised machine learning component 406 can perform unsupervised machine learning on ingested data and historical data to ascertain correlations between one or more particular events (e.g., fraud or avoidance thereof) and context/data points. All correlations, whether causative (or related in some other manner) or coincidental (or otherwise unrelated but for the correlation), can be determined using unsupervised machine learning.

Supervised machine learning component 408 and/or correlation interface 410 can be used to analyze the correlations discovered. Correlation interface 410 can be an input/output interface configured to provide information to a human operator and receive data representing their feedback, or can be an interface connecting to another system or component for reviewing correlations. Supervised machine learning component 408 can include supervised machine learning trained to select or discard correlations based on determinations as to whether they are causative or coincidental, whether they meet static or variable thresholds for correlation, whether they include any aspects controllable by a party involved or affected by the event or context, or other bases. One or both of supervised machine learning component 408 and correlation interface 410 can be used to select correlations with utility for actionable decisions.

Correlation database 412 can store correlations found between various event data and context data, and various feedback or changes based thereon. In embodiments, all correlations can be stored along with indications of whether such were selected or discarded. In embodiments, event or contextual data can also be stored in correlation database 412.

Management engine 414 can access correlation database to provide actionable feedback based on correlations identified. In embodiments, management engine can be operatively coupled with one or more interface (including but not limited to ingestion interfaces 402 and/or correlation interface 410) to receive information about a particular entity having context and determine whether that entity has correlation with an event or non-event.

Based on a determination of correlation to an event or non-event by management engine 414, update component 416 can determine actions to take to increase or decrease correlation or otherwise increase or decrease the likelihood of a particular outcome through use of supervised machine learning component 408, unsupervised machine learning component 406, or other rule-based or statistical analysis of correlations in correlation database 412. In embodiments, update component can automatically update various policies, rules, automated actions, or other communicatively coupled systems or tasks in response to the correlation. This can include changing an action (such as those described throughout this disclosure), providing a credit, imposing a penalty, modifying a policy or contract, modifying a management term or rule, changing a security setting, creating communication "touchpoints" between party at risk of fraud and MSR or fraud reduction team, et cetera.

Figure 5:
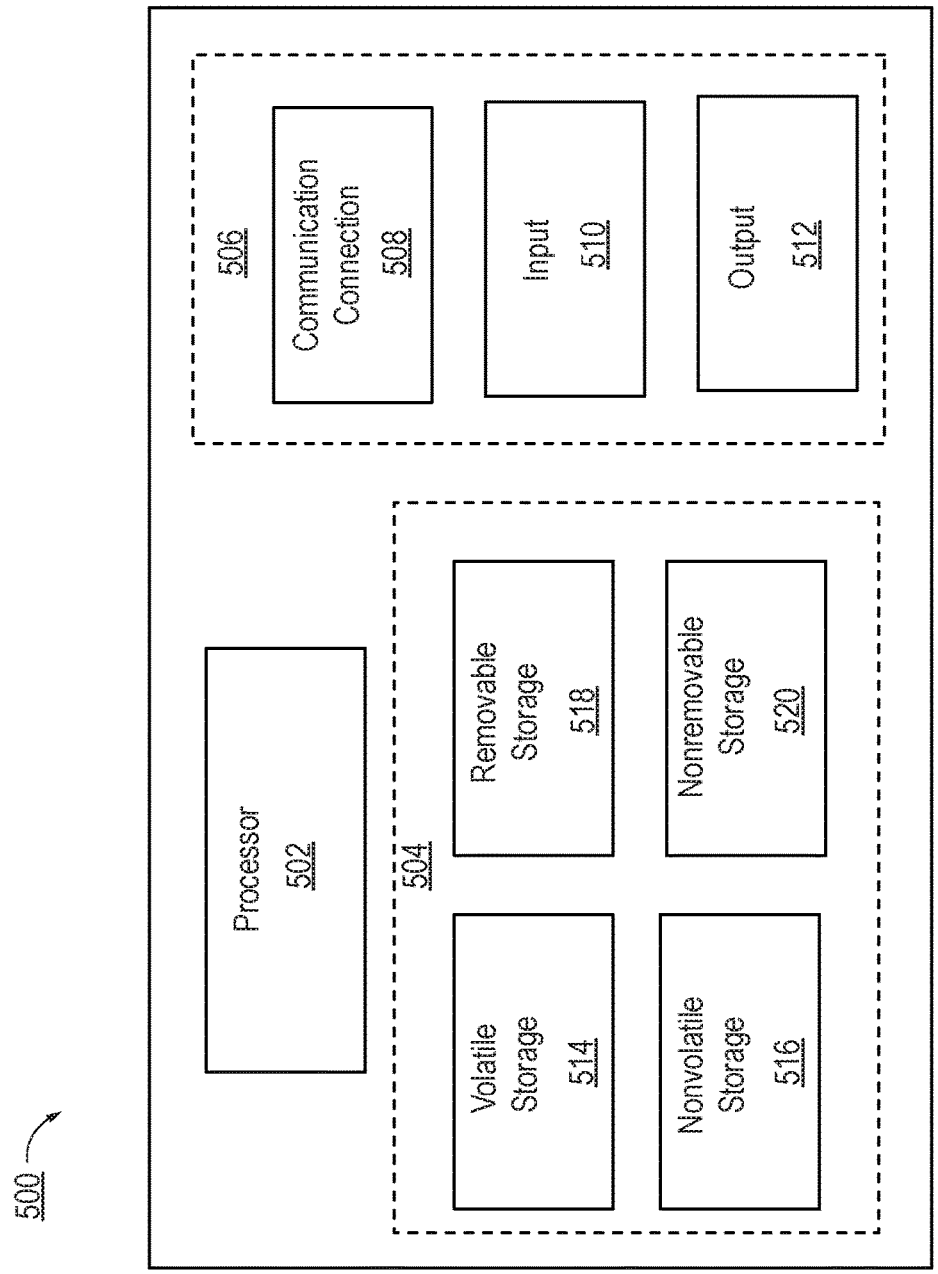
FIG. 5 is a block diagram illustrating an example implementation of a device which can be utilized in conjunction with or comprise a portion of systems disclosed or execute methods herein.

Aspects disclosed herein can be implemented using computer devices and networks. FIG. 5 illustrates a device 500. Device 500 may comprise all or a part of modules or components herein. Device 500 may comprise hardware or a combination of hardware and software. The functionality to facilitate telecommunications via a telecommunications network may reside in one or combinations of links, portals, or connections. Device 500 depicted in FIG. 5 may represent or perform functionality of an appropriate device 500, or combination of modules or components herein. It is emphasized that the block diagram depicted in FIG. 5 is an example and not intended to imply a limitation to a specific implementation or configuration. Thus, device 500 may be implemented in a single device or multiple devices. Multiple network entities may be distributed or centrally located. Multiple network entities may communicate wirelessly, via hard wire, or any appropriate combination thereof.

Device 500 may comprise a processor 502 and a memory 504 coupled to processor 502. Memory 504 may contain executable instructions that, when executed by processor 502, cause processor 502 to effectuate operations associated with aspects disclosed herein. As evident from the description herein, device 500 is not to be construed as software per se.

In addition to processor 502 and memory 504, device 500 may include an input/output system 506. Processor 502, memory 504, and input/output system 506 may be coupled together (coupling not shown in FIG. 5) to allow communications there between. Each portion of device 500 may comprise circuitry for performing functions associated with each respective portion. Thus, each portion may comprise hardware, or a combination of hardware and software. Accordingly, each portion of device 500 is not to be construed as software per se. Input/output system 506 may be capable of receiving or providing information from or to a communications device or other network entities configured for telecommunications. For example input/output system 506 may include a wireless communications (e.g., WiFi/2.5G/3G/4G/5G/GPS) card. Input/output system 506 may be capable of receiving or sending video information, audio information, control information, image information, data, or any combination thereof. Input/output system 506 may be capable of transferring information with device 500. In various configurations, input/output system 506 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 506 may comprise a WiFi finder, a two-way GPS chipset or equivalent, or the like, or a combination thereof.

Input/output system 506 of device 500 also may contain communication connection 508 that allows device 500 to communicate with other devices, network entities, or the like. Communication connection 508 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 506 also may include an input device 510 such as keyboard, mouse, pen, voice input device, or touch input device. Input/output system 506 may also include an output device 512, such as a display, speakers, or a printer.

Processor 502 may be capable of performing functions associated with aspects described herein. For example, processor 502 may be capable of, in conjunction with any other portion of device 500, managing social media communications as described herein.

Memory 504 of device 500 may comprise a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal. Memory 504, as well as any computer-readable storage medium described herein, is to be construed as an article of manufacture.

Memory 504 may store any information utilized in conjunction with telecommunications. Depending upon the exact configuration or type of processor, memory 504 may include a volatile storage 514 (such as some types of RAM), a nonvolatile storage 516 (such as ROM, flash memory), or a combination thereof. Memory 504 may include additional storage (e.g., a removable storage 518 or a nonremovable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 500. Memory 504 may comprise executable instructions that, when executed by processor 502, cause processor 502 to effectuate operations for, e.g., listening to social media activity.

Figure 6:
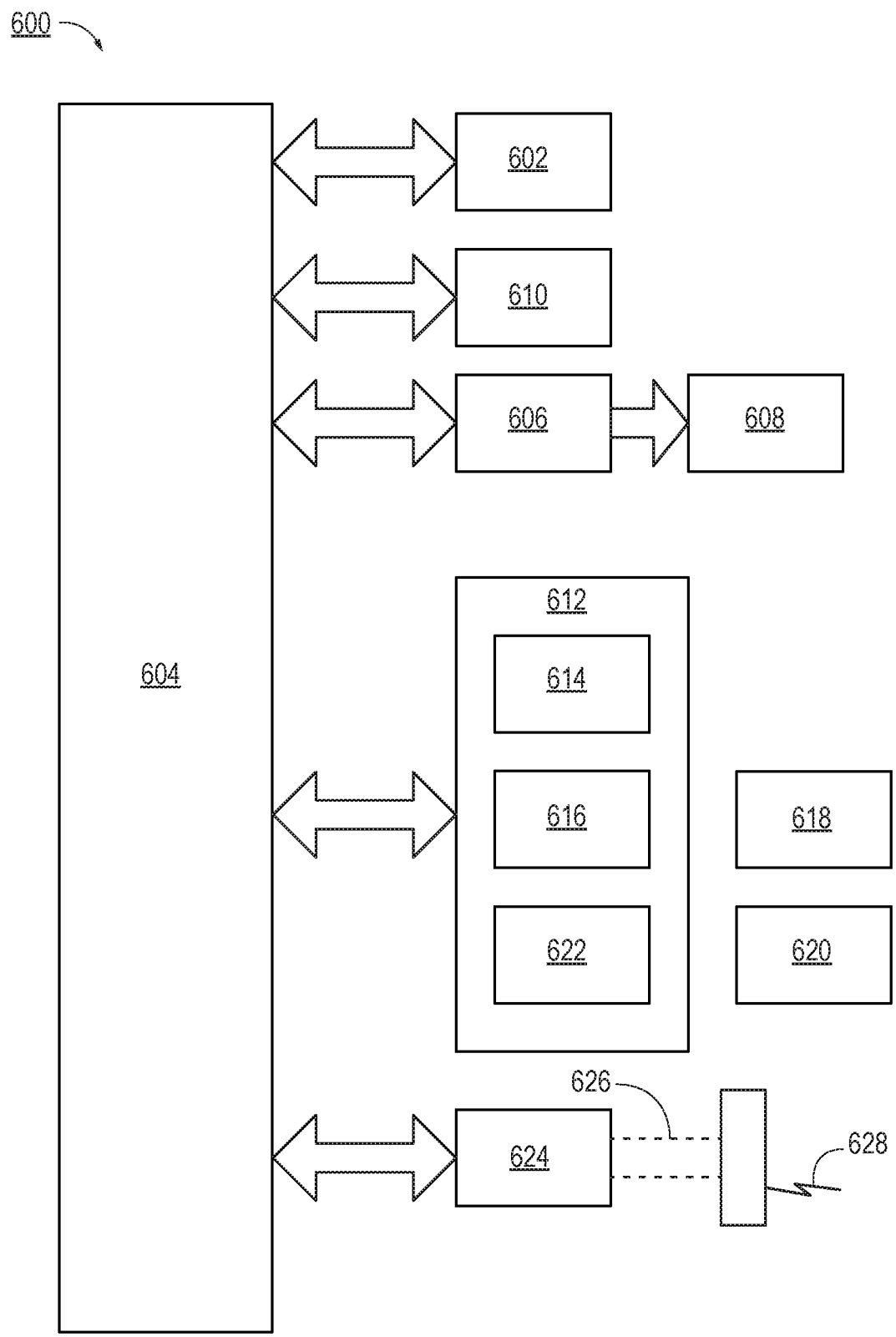
FIG. 6 is a block diagram of a computer system that be used to implement at least a portion of aspects herein.

FIG. 6 illustrates a computer-based system 600 that may constitute, include parts of, or be used to realize one or more of aspects of, e.g., systems or methodologies and techniques described herein. Computer-based system 600 includes at least one processor, such as a processor 602. Processor 602 may be connected to a communication infrastructure 604, for example, a communications bus, a cross-over bar, a network, or the like. Various software aspects are described in terms of this example computer-based system 600. Upon perusal of the present description, it will become apparent to a person skilled in the relevant art(s) how to implement the present disclosure using other computer systems or architectures.

Computer-based system 600 includes a display interface 606 that forwards graphics, text, or other data from communication infrastructure 604 or from a frame buffer (not shown) for display on a display unit 608.

Computer-based system 600 further includes a main memory 610, such as random access memory (RAM), and may also include a secondary memory 612. Secondary memory 612 may further include, for example, a hard disk drive 614 or a removable storage drive 616, representing a floppy disk drive, a magnetic tape drive, an optical disk drive, etc. Removable storage drive 616 reads from or writes to a removable storage unit 618 in a well-known manner. Removable storage unit 618 may represent a floppy disk, magnetic tape, or an optical disk, and may be read by and written to by removable storage drive 616. As will be appreciated, removable storage unit 618 includes a computer usable storage medium having computer software or data stored therein.

In accordance with various aspects of the present disclosure, secondary memory 612 may include other similar devices for allowing computer programs or other instructions to be loaded into computer-based system 600. Such devices may include, for example, a removable storage unit 620 and an interface 622. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 620 to computer-based system 600.

Computer-based system 600 may further include communication interface 624. Communication interface 624 may allow software or data to be transferred between computer-based system 600 and external devices. Examples of communication interface 624 include, but may not be limited to a modem, a network interface (such as an Ethernet card), a communications port, a Personal Computer Memory Card International Association (PCMCIA) slot and card, or the like. Software or data transferred via communication interface 624 may be in the form of a number of signals, hereinafter referred to as signals 626, which may be electronic, electromagnetic, optical or other signals capable of being received by communication interface 624. Signals 626 may be provided to communication interface 624 via a communication path (e.g., channel)628. Communication path 628 carries signals 626 and may be implemented using wire or cable, fiber optics, a telephone line, a cellular link, a radio frequency (RF) link, or other communication channels.

In this document, the terms "computer readable medium," "computer program medium." and "computer usable medium" are used to generally refer to media such as removable storage drive 616, a hard disk installed in hard disk drive 614, or the like. These computer program products provide software to computer-based system 600. The present disclosure is directed to such computer program products. Unless otherwise articulated, such media are intended to be non-transitory.

Computer programs (also referred to as computer control logic) may be stored in main memory 610 or secondary memory 612. The computer programs may also be received via communication interface 604. Such computer programs, when executed, enable computer-based system 600 to perform the functions consistent with the present disclosure, as discussed herein. In particular, the computer programs, when executed, enable processor 602 to perform the features of the present disclosure. Accordingly, such computer programs represent controllers of computer-based system 600.

In accordance with an aspect of the present disclosure, where the disclosure is implemented using a software, the software may be stored in a computer program product and loaded into computer-based system 600 using removable storage drive 616, hard disk drive 614, or communication interface 624. The control logic (software), when executed by processor 602, causes processor 602 to perform the functions of the present disclosure as described herein.

A broad scope and variety of systems, methods, and computer products are disclosed herein. In an example, a method comprises ingesting fraud data related to a fraud event. The fraud data includes contextual data describing context surrounding the fraud event, and the fraud data is ingested to an individual record associated with an entity involved in the fraud event, and wherein the individual record has a record format. The method also comprises ingesting real-time transaction data, wherein the real-time transaction data includes data describing a requested transaction and transactional contextual data associated with the requested transaction. The method also comprises determining whether a correlation match exists between the fraud data and the real-time transaction data and causing an action to close the real-time transaction associated with the real-time transaction data based on the correlation match. Closing the real-time transaction includes causing completion of the real-time transaction when the correlation match does not exist, and closing the real-time transaction includes freezing the real-time transaction when the correlation match exists.

Specific embodiments of the foregoing method can provide additional details. Another example embodiment of the example method can comprise providing a notification that the real-time transaction has been frozen. Another example embodiment of the example method can comprise determining a context difference between the fraud data and the contextual data. Another example embodiment of the example method can comprise determining an action to reconcile the context difference. Another example embodiment of the example method can comprise preparing at least one of the fraud data and the real-time transaction data according to the record format. In another example embodiment of the example method, machine learning identifies one or more fields of the record format to be populated by the fraud data and the real-time transaction data. In another example embodiment of the example method, the record format is dynamically updated based on identification of a new field type by the machine learning.

In an example, a system comprises a non-transitory computer-readable medium storing instructions. The instructions are configured to effectuate a data ingestion component configured to ingest fraud data related to a fraud event and real-time transaction data related to a real-time transaction request, wherein the fraud data includes contextual data describing context surrounding the fraud event, wherein the real-time transaction data includes data describing a requested transaction and transactional contextual data associated with the requested transaction, wherein the fraud data is ingested to an individual record associated with an entity involved in the fraud event, and wherein the individual record has a record format. The instructions are configured to effectuate a correlation component configured determine whether a correlation match exists between the fraud data and the real-time transaction data. The instructions are also configured to effectuate a user interface configured to provide a notification based on the correlation.

Specific embodiments of the foregoing system can provide additional details. In another example system, the instructions are further configured to effectuate a transaction approval component configured to complete the real-time transaction or freeze the real-time transaction based on the correlation match. In another example system, the instructions are further configured to effectuate a data preparation component configured to prepare at least one of the fraud data and the real-time transaction data according to the record format. In another example system, the instructions are further configured to effectuate a fraud detection database. In another example system, the correlation component is configured to cause an action to close the real-time transaction associated with the real-time transaction data based on the correlation match; closing the real-time transaction includes causing completion of the real-time transaction when the correlation match does not exist; and closing the real-time transaction includes freezing the real-time transaction when the correlation match exists. In another example system, the correlation component is configured to determine a context difference between the fraud data and the contextual data. In another example system, the correlation component is configured to determine an action to reconcile the context difference.

Aspects similar to the example method(s) or system(s) can be embodied in instructions on a computer readable medium or other computer product that when executed or utilized effects processes like those of the method or other systems herein.

In embodiments, one or more methodologies herein can be combined in any order, or aspects of methodologies can be re-ordered. Methodologies or aspects thereof may be performed simultaneously or in conjunction. In this manner, the methodologies described and other aspects of systems can be implemented in integrated manners to provide asset management. Methodologies can proceed iteratively until all anomalies are identified and/or an entire asset or group of assets is inspected. Methodologies herein can proceed iteratively until all anomalies are addressed or further resources are unavailable to address any anomaly.

While systems and methodologies herein are described separately, it is understood that techniques, functionality, routines, and aspects of the systems can be performed by or implemented in the methodologies, and vice versa.

The present disclosure can be implemented in hardware such as, for example, computing hardware and/or application specific integrated circuits (ASIC), software, or combinations of hardware and software. Implementation of a hardware machine, software, or combinations thereof to perform functions described herein will be apparent to persons skilled in the relevant art(s).

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described in some instances with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions or special purpose hardware.

In software embodiments, such software elements may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory (e.g., a non-transitory computer-readable medium) that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, some or all of the computer program instructions may be executed on any remote-hosted application framework, for example, by a processor associated with a cloud server.

Accordingly, functional blocks of the block diagrams and flow diagram illustrations support combinations of resources for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, et cetera. The illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Methodologies herein are described with specific aspects for ease of explanation with respect to various embodiments. However, methodologies embraced under the scope and spirit of the disclosure may vary, to include excluding any of the particular aspects described to define broader or different methods for various use cases or results.

As will be understood, data ingestion, analyses, actions, and communication can be performed or caused as described herein using servers and collective resources, with data transmitted over networks. In this manner, client devices— such as those of entities at risk of fraud or parties charged with detecting and preventing fraud—can achieve the benefits of extensive data and intensive processing without consuming the storage, memory, processing power, and bandwidth available to those devices. This provides superior results that cannot be achieved using only a local device on behalf of the user, and does not degrade the user experience as would attempting to achieve even a fraction of the results achieved based on the disclosures herein.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A method, comprising:
    ingesting fraud data related to fraud events, wherein the fraud data includes contextual data describing context surrounding the fraud events, wherein the fraud data respectively associated with each of the fraud events is ingested to an individual record associated with an entity involved in the respective fraud event, and wherein the individual record has a record format;
    ingesting transaction data, wherein the transaction data includes data describing transactions and transactional contextual data associated with the transactions;
    determining a plurality of correlations between the fraud data and the transaction data using unsupervised machine learning of the individual record;
    analyzing the plurality of correlations using supervised machine learning to identify at least one causative correlation;
    receiving real-time transaction data, wherein the real-time transaction data includes data describing a requested transaction and real-time transactional contextual data associated with the requested transaction;
    determining whether a fraud correlation match exists for the requested transaction based on the real-time transaction data corresponding to at least one of the at least one causative correlation; and
    causing an action to close the real-time transaction associated with the real-time transaction data based on the fraud correlation match,
    wherein closing the real-time transaction includes causing completion of the real-time transaction when the correlation match does not exist, and
    wherein closing the real-time transaction includes freezing the real-time transaction when the fraud correlation match exists.

2. The method of claim 1, comprising:
    providing a notification that the real-time transaction has been frozen.

3. The method of claim 1, comprising:
    determining a context difference between the fraud data and the contextual data; and
    determining an action to reconcile the context difference.

4. The method of claim 1, comprising:
preparing at least one of the fraud data and the real-time transaction data according to the record format.

5. The method of claim 1, wherein machine learning identifies one or more fields of the record format to be populated by the fraud data and the real-time transaction data, and wherein the record format is dynamically updated based on identification of a new field type by the machine learning.

6. The method of claim 1, comprising:
discarding, using supervised machine learning, at least one of the plurality of correlations based on the at least one of the plurality of correlations being non-causative.

7. The method of claim 1, comprising:
causing an incentive to be offered to a party associated with the requested transaction based on the party completing a behavior that eliminates the fraud correlation match.

8. A system, comprising a non-transitory computer-readable medium storing instructions configured to effectuate:
a data ingestion component configured to ingest fraud data related to fraud events and transaction data related to transactions, wherein the fraud data includes contextual data describing context surrounding the fraud events, wherein the transaction data includes real-time transaction data, wherein real-time transaction data among the transaction data includes data describing a requested transaction and transactional contextual data associated with the requested transaction, wherein the fraud data associated with each of the fraud events is ingested to an individual record associated with an entity involved in the re iv fraud event, and wherein the individual record has a record format;
an unsupervised machine learning component configured to determine a plurality of correlations between the fraud data and the transaction data using unsupervised machine learning of the individual record;
a supervised machine learning component configured to analyze the plurality of correlations using supervised machine learning to identify at least one causative correlation;
a correlation component configured to determine whether a fraud correlation match exists for the requested transaction based on the real-time transaction data corresponding to at least one of the at least one causative correlation; and
a user interface configured to provide a notification based on the correlation.

9. The system of claim 8,
wherein the correlation component is configured to cause an action to close the real-time transaction associated with the real-time transaction data based on the fraud correlation match,
wherein closing the real-time transaction includes causing completion of the real-time transaction when the fraud correlation match does not exist, and
wherein closing the real-time transaction includes freezing the real-time transaction when the fraud correlation match exists.

10. The system of claim 9, wherein the instructions are further configured to effectuate:
a transaction approval component configured to complete the real-time transaction or freeze the real-time transaction based on the fraud correlation match.

11. The system of claim 8, wherein the instructions are further configured to effectuate:
a data preparation component configured to prepare at least one of the fraud data and the real-time transaction data according to the record format.

12. The system of claim 8, wherein the instructions are further configured to effectuate:
a fraud detection database.

13. The system of claim 8, wherein the correlation component is configured to determine a context difference between the fraud data and the contextual data.

14. The system of claim 13, wherein the correlation component is configured to determine an action to reconcile the context difference.

15. A non-transitory computer-readable medium storing instructions that when executed by a processor effectuate operations comprising:
ingesting fraud data related to fraud events, wherein the fraud data includes contextual data describing context surrounding the fraud events, wherein the fraud data associated with each of the fraud events is ingested to an individual record associated with an entity involved in the respective fraud event, and wherein the individual record has a record format;
ingesting transaction data, wherein the transaction data includes data describing transactions and transactional contextual data associated with the transactions;
determining a plurality of correlations between the fraud data and the transaction data using unsupervised machine learning of the individual record;
analyzing the plurality of correlations using supervised machine learning to identify at least one causative correlation;
receiving real-time transaction data, wherein the real-time transaction data includes data describing a requested transaction and real-time transactional contextual data associated with the requested transaction;
determining whether a fraud correlation match exists for the requested transaction based on the real-time transaction data corresponding to at least one of the at least one causative correlation; and
causing an action to close the real-time transaction associated with the real-time transaction data based on the fraud correlation match,
wherein closing the real-time transaction includes causing completion of the real-time transaction when the fraud correlation match does not exist, and
wherein closing the real-time transaction includes freezing the real-time transaction when the fraud correlation match exists.

16. The non-transitory computer-readable medium of claim 15, wherein the instructions when executed effectuate operations comprising:
providing a notification that the real-time transaction has been frozen.

17. The non-transitory computer-readable medium of claim 15, wherein the instructions when executed effectuate operations comprising:
determining a context difference between the fraud data and the contextual data.

18. The non-transitory computer-readable medium of claim 17, wherein the instructions when executed effectuate operations comprising:
determining an action to reconcile the context difference.

19. The non-transitory computer-readable medium of claim 15, wherein machine learning identifies one or more fields of the record format to be populated by the fraud data and the real-time transaction data.

20. The non-transitory computer-readable medium of claim 19, wherein the record format is dynamically updated based on identification of a new field type by the machine learning.

\* \* \* \* \*